US 6,692,261 B2

(12) United States Patent
Matsuda et al.

(10) Patent No.: US 6,692,261 B2
(45) Date of Patent: Feb. 17, 2004

(54) VEHICLE AIR-CONDITIONING MODULE

(75) Inventors: Yutaka Matsuda, Tokyo (JP); Mitsutaka Ohara, Tokyo (JP); Minoru Asano, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/950,747

(22) Filed: Sep. 10, 2001

(65) Prior Publication Data

US 2002/0094714 A1 Jul. 18, 2002

(30) Foreign Application Priority Data

Sep. 11, 2000 (JP) .................................. 2000-274887
Oct. 12, 2000 (JP) .................................. 2000-312719

(51) Int. Cl.$^7$ .............................................. H01R 33/00
(52) U.S. Cl. ........................................................ 439/34
(58) Field of Search ............................ 439/34, 950, 247, 439/248

(56) References Cited

U.S. PATENT DOCUMENTS

| 4,669,793 | A | * | 6/1987 | Hayashi et al. ................ 439/64 |
| 5,856,908 | A | * | 1/1999 | Takiguchi et al. ........... 361/690 |
| 5,860,288 | A | * | 1/1999 | Morimoto et al. ............. 62/244 |
| 5,884,875 | A | * | 3/1999 | Hanada et al. ............... 248/27.1 |
| 6,062,888 | A | * | 5/2000 | Takiguchi .................... 439/248 |
| 6,065,988 | A | * | 5/2000 | Kubota ........................ 439/329 |
| 6,108,905 | A | * | 8/2000 | Nishitani et al. ............. 29/869 |
| 6,257,897 | B1 | * | 7/2001 | Kubota ......................... 439/34 |
| 6,502,888 | B2 | * | 1/2003 | Inoue et al. .................. 296/72 |

* cited by examiner

*Primary Examiner*—Javaid H. Nasri
*Assistant Examiner*—Thanh-Tam Le
(74) *Attorney, Agent, or Firm*—Knobbe Martens Olson & Bear LLP

(57) ABSTRACT

The present invention provides a vehicle air-conditioning module wherein the surface thereof opposed to the mounting surface of an instrument panel includes at least one electrical component connector which is to be connected directly with the connector of the corresponding one of electrical components through a mount opening formed through the mounting surface of the instrument panel. The present invention also provides another vehicle air-conditioning module comprising an air-conditioner body mounted on the inner wall of a dash panel partitioning between a passenger room and an engine room, an electrical connection box mounted on the top of the air-conditioner body, a first connector mounted in a through-aperture formed in the dash panel and electrically connected with an engine room wire harness, and a second connector mounted on the surface of the electrical connection box opposed to the engine room and electrically connected with the corresponding one of electronic parts in the electrical connection box while fitting to the first connector.

10 Claims, 15 Drawing Sheets

PRIOR ART

Fig.14 (A) PRIOR ART

PRIOR ART

VEHICLE AIR-CONDITIONING MODULE

BACKGROUND OF THE INVENTION

The present invention relates to a vehicle air-conditioning module to be mounted in a vehicle instrument panel.

In general, the vehicle air-conditioning system to be mounted in a motorcar or the like is substantially centrally arranged in the interior of the instrument panel and fixed to the vehicle body directly or through a fixing bracket or the like.

An air-conditioner sub-wire harness arranged on and fixed to the surface of the vehicle air-conditioning system is electrically connected to electrical parts such as a mode-selecting servomotor, air-mixing servomotor, air-conditioning control unit, blower unit and the like. The air-conditioner sub-wire harness includes a connector for electrically connecting with a vehicle wire harness. Such a connector will be connected to a connector on the vehicle wire harness when the air conditioner is or has been mounted on the vehicle.

If the vehicle air-conditioning system is mounted directly in the interior of the instrument panel, the connector in the air-conditioner sub-wire harness is connected to a connector in an instrument panel wire harness.

The instrument panel wire harness comprises a trunk portion arranged across the instrument panel and offset portions branched from the trunk portion and including connectors on the tip portions thereof. The trunk portion is fixedly mounted on the backside of the instrument panel body or on a cross car beam, air-conditioning duct or the like which is mounted in the instrument panel. The offset portions are connected with an air conditioner mounted in the interior of the instrument panel, an electrical components control unit and an electrical connection box or various other electrical components such as a center cluster panel mounted on the mounting surface of the instrument panel, a meter panel or the like.

When the instrument panel wire harness is to be mounted on the instrument panel, the trunk portion thereof is arranged and fixedly mounted in the interior of the instrument panel. Thereafter, the connectors on the tip ends of the offset portion are fitted into the corresponding electrical connectors in electrical components which have previously been mounted in the interior of the instrument panel. At this time, the offset portions may fixedly be mounted, at the middle thereof, on the instrument panel if the offset portions are not sufficiently held since the lengths thereof are too long. The connectors to be connected with the center cluster panel and instrument panel before they are mounted on the mounting surface of the instrument panel are left near the mount openings formed in the instrument panel body, without fixation.

On the other hand, the center cluster panel centrally disposed on the mounting surface of the instrument panel may include various electrical components such as a group of air-conditioner control switches, an audio device, a group of audio device control switches and others. The backside thereof may include connectors for the instrument panel wire harness. The center cluster panel is fixedly mounted around the mount openings which have centrally been formed in the mounting surface of the instrument panel.

FIG. 13 illustrates the prior art method of mounting an electrical component on the mounting surface of an instrument panel.

Referring to FIG. 13A, the mounting surface 43a of the instrument panel 43 includes a mount opening 43b substantially centrally formed therein. A connector 45 in an instrument panel wire harness 44 is left near the mount opening 43b without fixation.

Referring to FIG. 13B, the connector 45 of the instrument panel wire harness 44 is drawn out from the mounting surface 43a of the instrument panel 43 through the mount opening 43b and then fitted into a connector 47 on an electrical component 46, for example, of the center cluster panel or the like.

Thereafter, as shown in FIG. 13C, the electrical component 46 is fixedly mounted the mounting surface 43a around the mount opening 43b.

It is required that the offset portions of the instrument panel wire harness 44 including the connector 45 to be connected with the connector 47 of the electrical component 46 is drawn out from the mounting surface 43a of the instrument panel 43 through the mount opening 43b for connecting with the connector 47 of the electrical component 46. Therefore, the instrument panel wire harness 44 must have an extra length.

However, the operation for mounting the electrical component 46 of the center cluster panel or the other on the mounting surface 43a of the instrument panel 43 is manually carried out as described. Thus, an operator must use one hand to draw out the connector 45 of the instrument panel wire harness 44 from the mounting surface 43a of the instrument panel 43 through the mount opening 43b while using the other hand to support the electrical component 46. Under such a situation, the operator must cause the connectors 45 and 47 to fit with each other. This is extremely cumbersome and difficult.

Since each of the offset portions in the instrument panel wire harness 44 must have an extra length, the manufacturing cost is also increased. For the same cause, the offset portions of the instrument panel wire harness may be brought into contact with any other part in the instrument panel 43 when the electrical component 46 has been mounted. This may produce any defect such as production of an abnormal sound, damage of the wire harness, short-circuiting due to wire damage and so on. To avoid such a defect, various sound shut-off and wire protection parts may be mounted in the instrument panel 43. However, this will greatly increase the manufacturing cost.

FIGS. 14A and B are block diagrams illustrating different structures around the vehicle air-conditioning system according to the prior art while FIG. 15 is a perspective view of a dash panel including a vehicle air-conditioning system according to the prior art. As shown in FIGS. 14 and 15, the vehicle air-conditioning system 50 is substantially centrally arranged in the interior of an instrument panel 51 and fixedly mounted on the vehicle body directly or through a fixing bracket or the like.

An air-conditioner sub-wire harness 52 arranged on and fixed to the surface of the vehicle air-conditioning system 50 is electrically connected, through a connector 52a, to electrical parts 53 such as a mode-selecting servomotor, air-mixing servomotor, air-conditioning control unit, blower unit and the like. The connector 52a of the air-conditioner sub-wire harness 52 is electrically connected with a vehicle wire harness.

An electrical connection box 54 is disposed in the instrument panel 51 either on the driver or passenger side or both on the driver and passenger sides and fixedly mounted on the vehicle body directly or through fixation bracket (or brackets) or the like. The electrical connection box 54 includes a connector electrically connected with the vehicle wire harness.

The electrical connection box 54 also includes various electronic parts such as circuit protection parts, electrical components controllers and so on. In many cases, these electronic parts are connected with internal circuits in the electrical connection box 54 and further electrically connected with any external wire harness outside of the electrical connection box through connectors and with various electrical components mounted in the vehicle.

A dash panel wire harness 58 is disposed and fixedly mounted on the inner wall of a dash panel 57 which partitions between a passenger room 55 and an engine room 56. The dash panel wire harness 58 includes connectors 58a for electrical connection with the air-conditioner sub-wire harness 52 and electrical connection box 54. When the vehicle air-conditioning system 50 and electrical connection box 54 are or have been fixedly mounted on the vehicle body, the connectors 58a of the dash panel wire harness 58 are connected with the corresponding connectors in the air-conditioner sub-wire harness 52 and electrical connection box 54 such that the dash panel wire harness 58 will electrically be connected with the electrical component 53 of the vehicle air-conditioning system 50 and the electrical connection box 54, respectively (see FIG. 14A).

Where the vehicle air-conditioning system 50 and electrical connection box 54 are fixedly mounted on the body of the instrument panel 51, an instrument panel wire harness 59 is disposed and fixedly mounted in the instrument panel 51. The instrument panel wire harness 59 includes connectors 59a for electrical connection with the air-conditioner sub-wire harness 52 and electrical connection box 54. When the vehicle air-conditioning system 50 and electrical connection box 54 are or have been fixedly mounted on the main body of the instrument panel 51, the connectors 59a of the instrument panel wire harness 59 are electrically connected with the connectors 52a of the air-conditioner sub-wire harness 52 and the electrical connectors of the electrical connection box 54, respectively. Thus, the instrument panel wire harness 59 will electrically be connected with the electrical component 53 of the vehicle air-conditioning system 50 and the electrical connection box 54, respectively (see FIG. 14B).

In the prior art of FIG. 14A, the connectors 59a of the instrument panel wire harness 59 are connected with the connector 58a of the dash panel wire harness 58.

On the other hand, an engine room wire harness 60 is disposed and fixedly mounted in the engine room 56 of the vehicle. The engine room wire harness 60 is electrically connected with a battery 61, electrical connection box 62 and electrical components 63 to supply the electrical connection box 62 and electrical components 63 with an electric power from the battery 61.

The engine room wire harness 60 includes connectors 60a for electrical connection with the electrical connection box 54, dash panel wire harness 58 and instrument panel wire harness 59, all of which are located within the passenger room. The engine room wire harness 60 extends through a dash panel grommet (not shown) on the dash panel 57, a portion of which is disposed and fixedly mounted in the passenger room 55 for electrical connection with the electrical connection box 54, dash panel wire harness 58 and instrument panel wire harness 59 all of which are located within the room 55 (see FIGS. 14A and B).

When the battery 61, electrical connection box 62 and electrical components 63 in the engine room 56 are electrically connected with the electrical connection box 54 and electrical components 53 of the vehicle air-conditioning system 50 in the passenger room 55 through the engine room wire harness 60, dash panel wire harness 58 and instrument panel wire harness 59 as described, the electric power can similarly be supplied to the electrical connection box 54 and the electrical components 53 of the vehicle air-conditioning system 50.

However, the aforementioned prior art has the following problems:

(1) Since the vehicle air-conditioning system, electrical connection box, dash panel wire harness or instrument panel wire harness is assembled through fitting at the respective connectors when it is or has been fixedly mounted on the vehicle during assembling of the vehicle or during sub-assembling of the instrument panel, a huge number of assembling steps are required. Particularly, the wire harnesses make the mounting on the vehicle and the assembling through the dash panel very troublesome with a great number of assembling steps, since they are flexible and difficult to maintain their forms.

(2) Since various electrical parts in the electrical connection boxes such as the circuit protection parts, electrical components controls and so on may be subjected to malfunction due to heat, they require heat radiating parts such as heat pipes, heat sinks or the like. This makes the system complicated with increase of the manufacturing cost.

SUMMARY OF THE INVENTION

The first present invention provides an vehicle air-conditioning module adapted to be located in the interior of an instrument panel having a mounting surface on which an electrical component (or electrical components) is or are to be mounted, said module comprising at least one electrical component connector connected directly with the corresponding connector in each of said electrical components through a mount opening formed in the mounting surface of said instrument panel, said electrical component connector being located on the surface of said module opposed to said mounting surface.

The second present invention provides a vehicle air-conditioning module having an air-conditioner body located on the inner wall of a dash panel partitioning between a passenger room and an engine room, and an electrical connection box mounted on said air-conditioner body, said module comprising a first connector mounted in a through-aperture formed in said dash panel and electrically connected with an engine room wire harness disposed within said engine room, and a second connector mounted on the side of said electrical connection box opposed to said engine room and electrically connected with the corresponding one of electrical components in said electrical connection box while being fitted to said first connector.

The third present invention provides a vehicle air-conditioning module having an air-conditioner body located on the inner wall of a dash panel partitioning between a passenger room and an engine room, and an electrical connection box mounted on said air-conditioner body, said module comprising a first connector electrically connected with an engine room wire harness disposed in said engine room, and a second connector mounted in a through-aperture formed in said dash panel for electrically connecting with the corresponding one of electronic parts in said electrical connection box while fitting to said first connector.

DETAILED DESCRIPTION

Several embodiments of the present invention will now be described with reference to the drawings.

Referring to FIGS. 1–5, a vehicle air-conditioning module K1 according to the first embodiment of the present invention comprises an air-conditioner body 1 located in the interior of a vehicle instrument panel 3 and an electrical connection box 2 mounted on the top of the air-conditioner body 1.

The air-conditioner body 1 is depended from a cross car beam (or auxiliary) bar in the instrument panel 3 or fixedly mounted on the vehicle floor. The air-conditioner body 1 also includes a temperature-regulating air duct and blower (not shown) mounted thereon.

Figure 1:
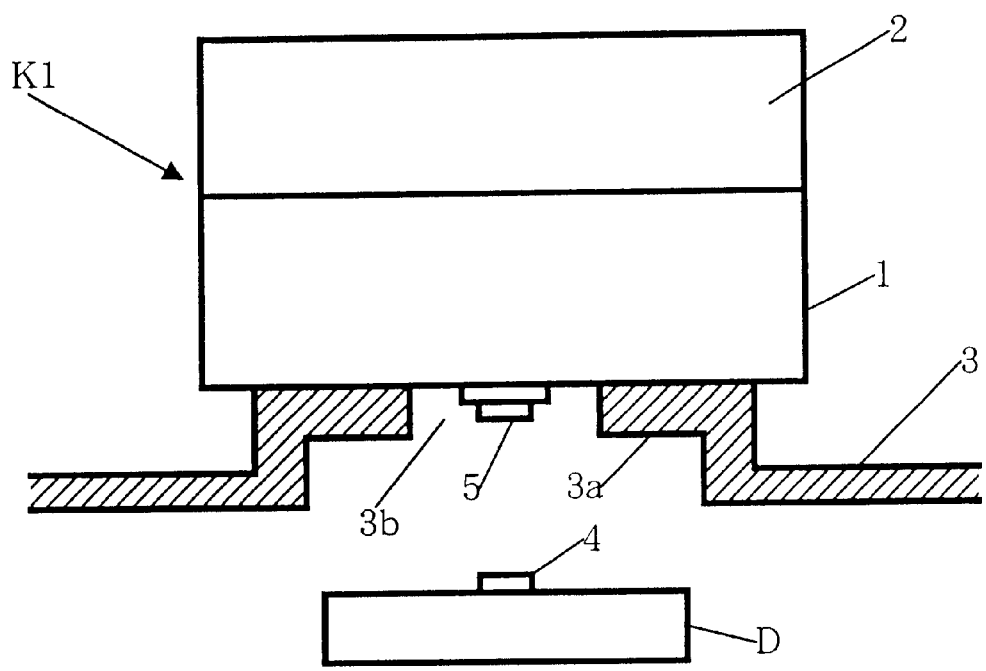
FIG. 1A is a plan cross-sectional view showing a state before a connector in the main body of a vehicle air-conditioning module according to the first embodiment of the present invention is connected with an electrical component connector on the mounting surface of an instrument panel.
FIG. 1B is a view similar to FIG. 1A showing another state after these connectors have been connected with each other.
Figure 1:
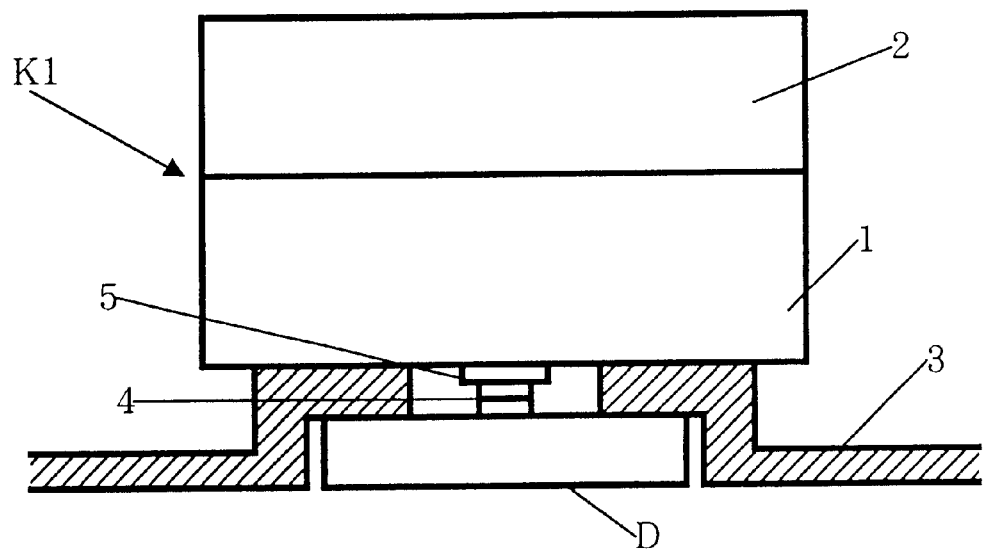
Figure 2:
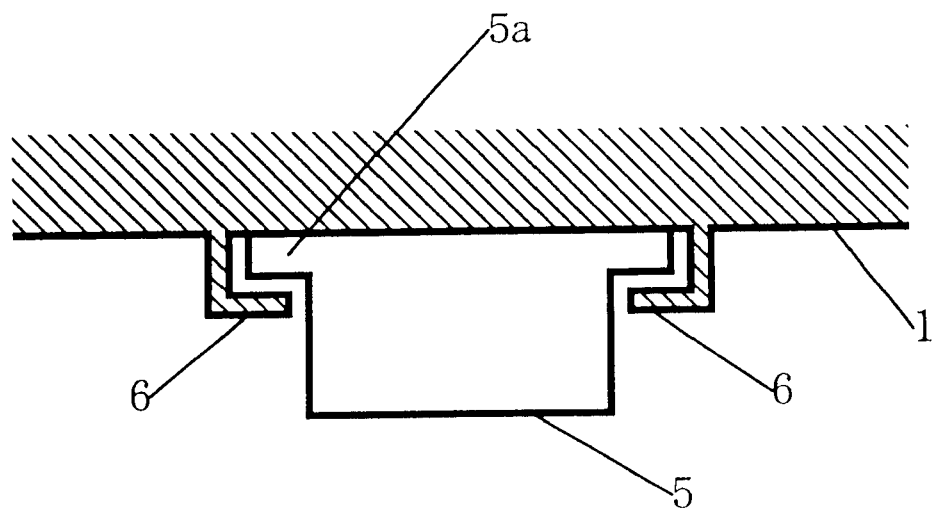
FIG. 2A is a plan cross-sectional view showing the structure of an electrical component connector.
FIG. 2B is a view similar to FIG. 2A showing a modified structure of the electrical component connector.
Figure 2:
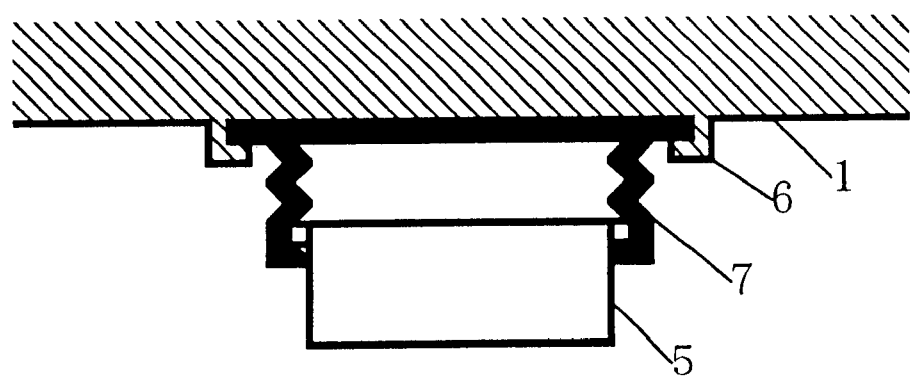

As shown in FIG. 1, the air-conditioner body 1 further includes an electrical component connector 5 located on its surface adjacent to the mounting surface 3a of the instrument panel 3. The electrical component connector 5 is to be connected directly with a connector 4 of an electrical component D in a center cluster panel or the like through a mount opening 3b which is formed through the mounting surface 3a of the instrument panel 3. The electrical component D may be any suitable component other than the center cluster panel.

Referring to FIG. 2A, the electrical component connector 5 has a widened base end 5a which is held by a holding member 6 of substantially L-shaped cross-sectional configuration as viewed in the plane, the holding member 6 being formed on the surface of the air-conditioner body 1. The electrical component connector 5 may be held by the holding member 6 such that it is movable about 2–3 mm at least in a direction perpendicular to the connector 4 of the electrical component D and preferably in the three-dimensional direction. As a result, any defective fitting between the connectors 4 and 5 due to dimensional error, assembling error or the like can be avoided.

Referring to FIG. 2B, the electrical component connector 5 may be formed by any suitable resilient material and mounted on the air-conditioner body 1 through a connection 7 held by the holding member 6. In such a case, the resilience in the connection 7 can properly position the electrical component connector 5 to avoid the defective fitting between the connectors 4 and 5 due to any dimensional error, assembling error or the like.

If the electrical component connector 5 is an electromagnetic induction type connector having a primary coil and the connector 4 of the electrical component D is an electromagnetic induction type connector having a secondary coil, a control device for controlling the operation of each of the connectors may be provided respectively on the air-conditioner body 1 and electrical component D. When the electrical component D is mounted on the mounting surface 3a of the instrument panel 3, thus, the above electromagnetic induction type connectors 4 and 5 can be fixedly mounted on the air-conditioner body 1 in a position wherein the electric power and signals can be transmitted to the electrical component D. In this case, since the electrical connection can be secured between the connectors 4 and 5 not contacting with each other, any defective connection therebetween due to due to any dimensional error, assembling error or the like can be avoided.

Figure 3:
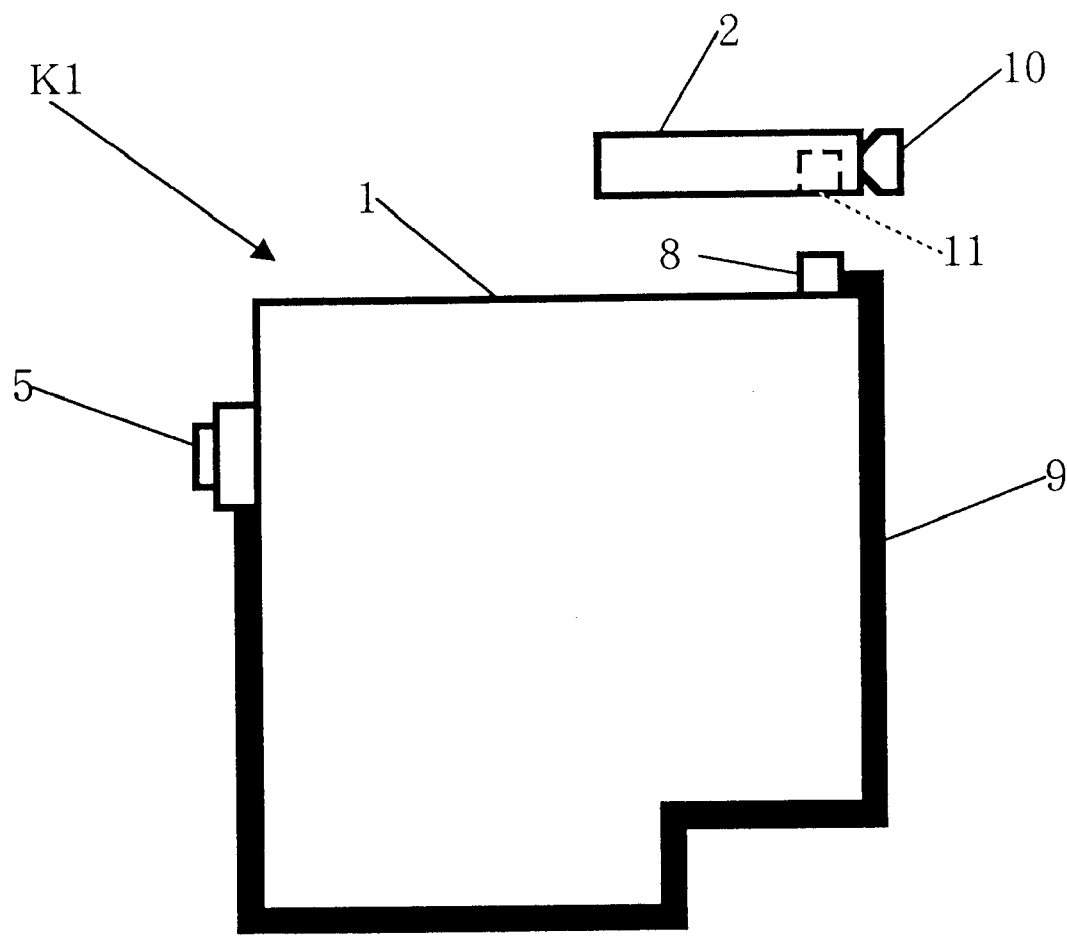
FIG. 3 is a side view schematically showing an air-conditioner body and electrical connection box which form the vehicle air-conditioning module according to the first embodiment of the present invention.
Figure 4:
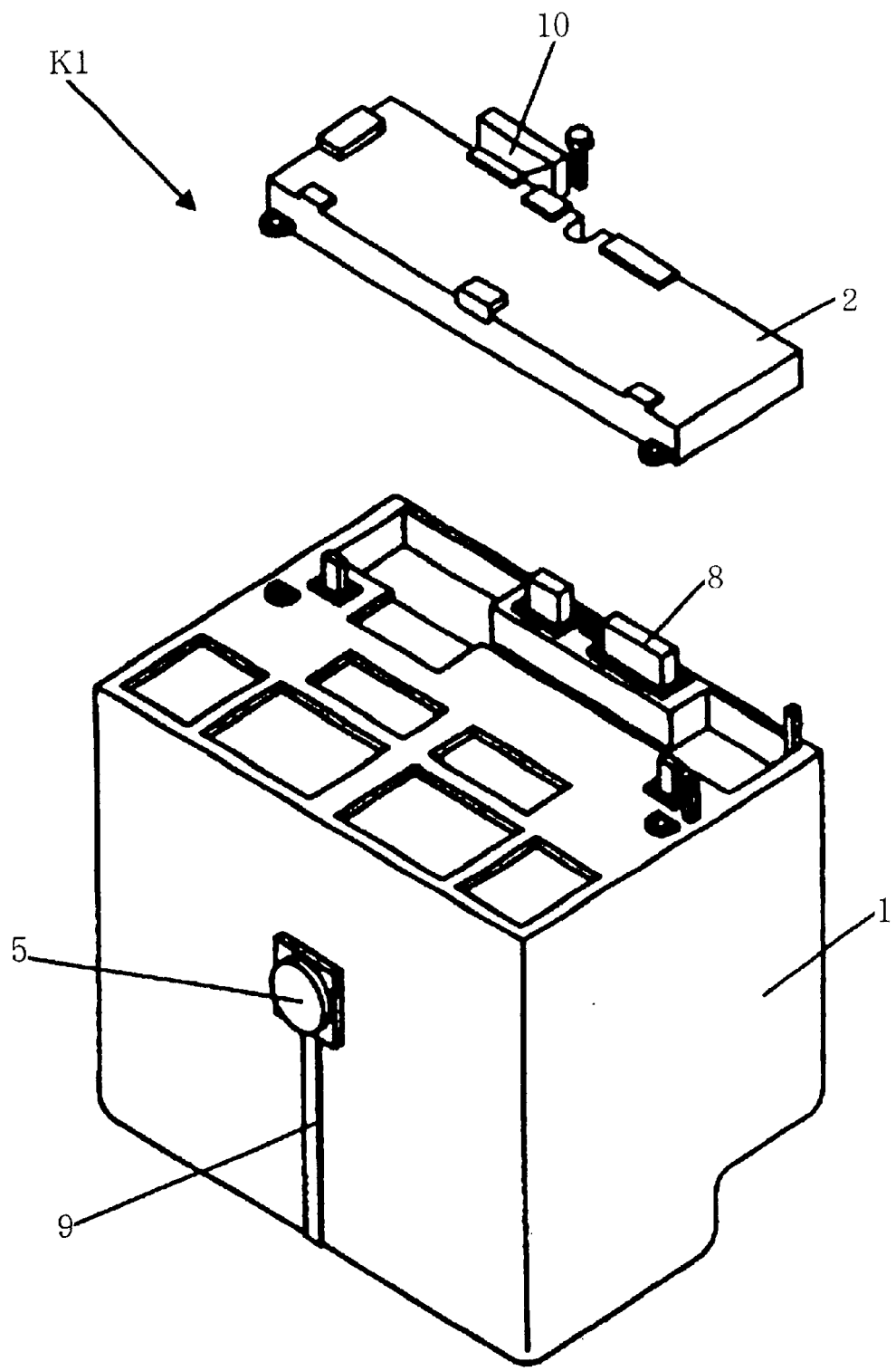
FIG. 4 is a perspective view showing the air-conditioner body and electrical connection box which are shown separated from each other.

As shown in FIGS. 3 and 4, an air-conditioner body power supply connector 8 is located on the top of the air-conditioner body 1. The air-conditioner body power supply connector 8 is connected to the electrical component connector 5 through a air-conditioner sub-wire harness 9 which is fixedly mounted on the surface of the air-conditioner body 1 through adhesive or fitting. The air-conditioner sub-wire harness 9 is preferably in the form of a flat type wire harness.

On the other hand, the electrical connection box 2 is fixedly mounted on the air-conditioner body 1 through bolting or locking.

The electrical connection box 2 includes various electronic parts such as circuit protection parts, electrical component controls and the like, wiring materials for electrically connecting the electronic parts, such as flat type conductors and wires, and electrical connection box power supply and distribution connectors 10, 11 for electrically connecting between the vehicle power source and external electrical components.

Figure 5:
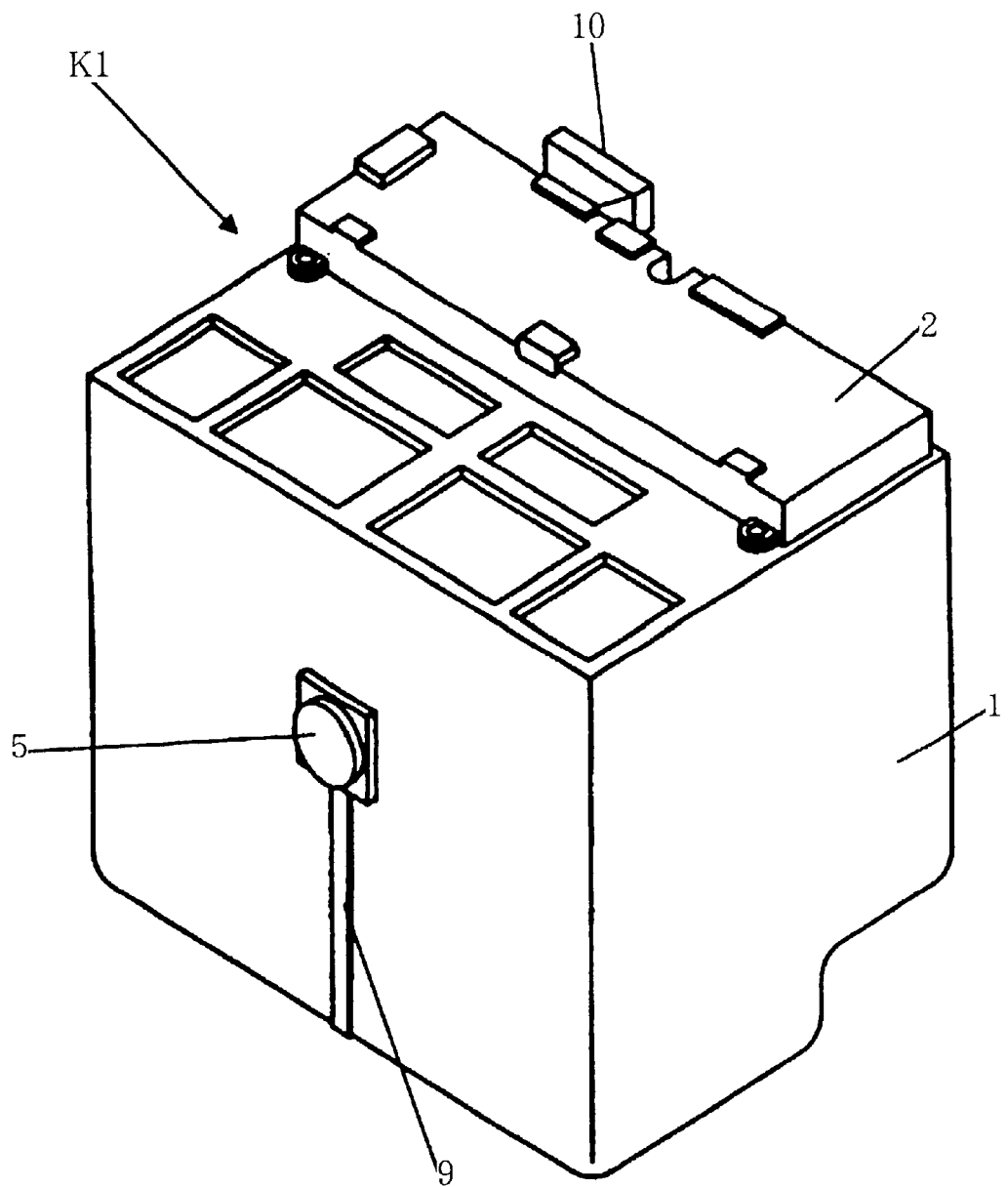
FIG. 5 is a perspective view showing the air-conditioner body on which the electrical connection box has been mounted.

Referring to FIG. 5, the electrical connection box power distribution connector 11 of the electrical connection box 2 is connected with the air-conditioner body power supply connector 8 when the electrical connection box 2 is mounted on the air-conditioner body 1.

The electrical connection box power supply connection 10 is connected with an engine room wire harness connector (not shown) that has been connected with a vehicle power source such as a battery. Thus, the power can be supplied from the battery to the electrical connection box 2, air-conditioner body 1 and electrical component D.

As will be apparent from FIGS. 1A and B, the electrical component connector 5 located on the air-conditioner body 1 of the vehicle air-conditioning module K1 according to the first embodiment of the present invention is connected directly with the connector 4 of the electrical component D attached to the mounting surface 3a of the instrument panel 3 through the mount opening 3b.

Therefore, the electrical component connector 5 will be connected with the connector 5 of the electrical component D at the same time when the electrical component D is mounted on the mounting surface 3a of the instrument panel 3. Therefore, the connection between the connectors can be simplified to highly improve the operability.

Furthermore, the manufacturing cost can be reduced since the instrument panel wire harness does not require any extra length. This can prevent the occurrence of any abnormal sound due to the extra length of the wire harness and a problem raised by short-circuiting due to the damage of wire. Therefore, the abnormal sound prevention and wire protection parts are not required, also leading to reduction of the manufacturing cost.

Figure 6:
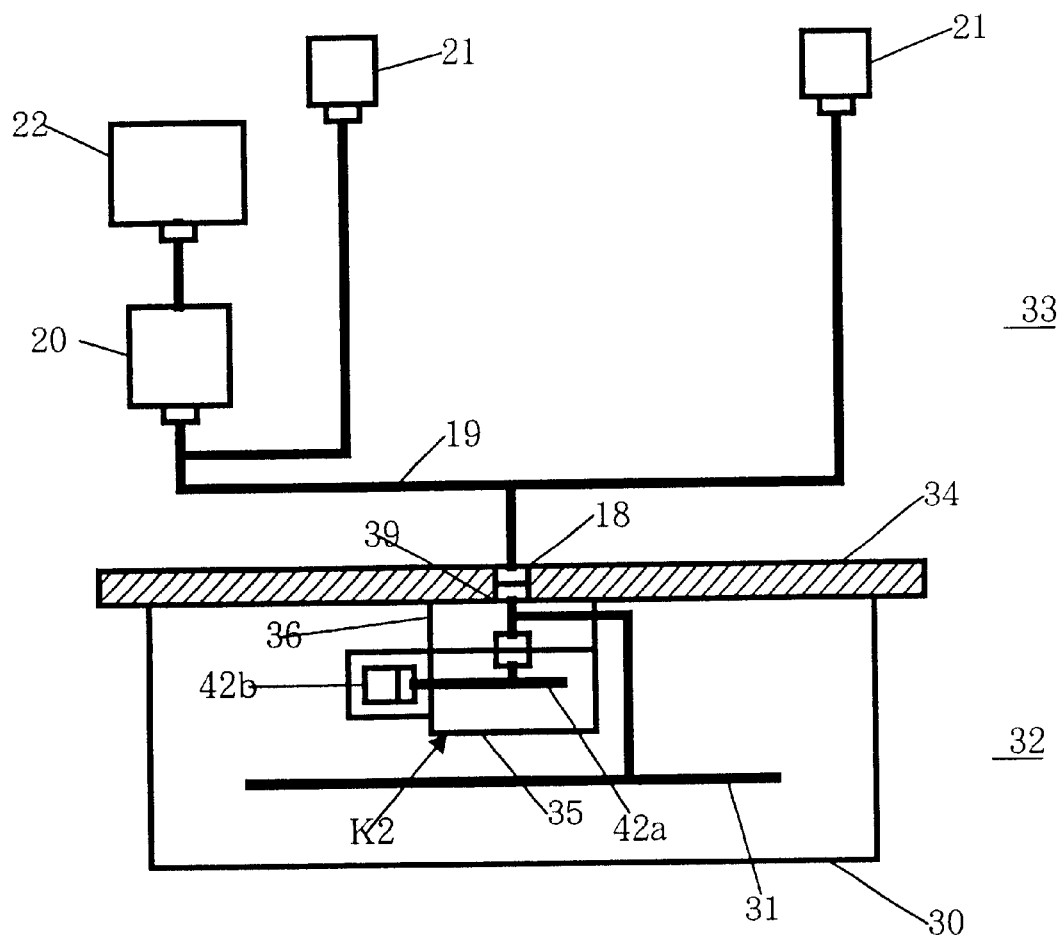
FIG. 6 is a block diagram illustrating a vehicle air-conditioning module and associated parts which are constructed according to the second embodiment of the present invention.
Figure 7:
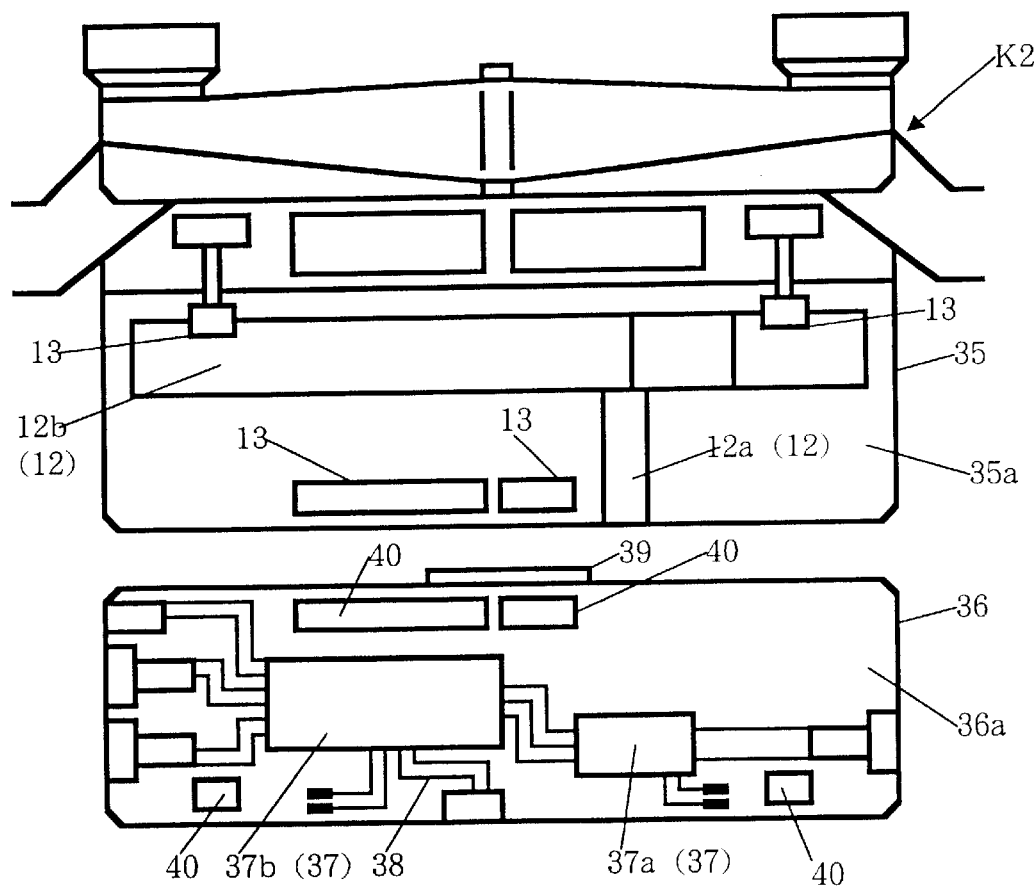
FIG. 7A is a plan view showing the internal structures of the air-conditioner body and electrical connection box.
FIG. 7B is a plan view showing the air-conditioner body on which the electrical connection box has been mounted.
Figure 7:
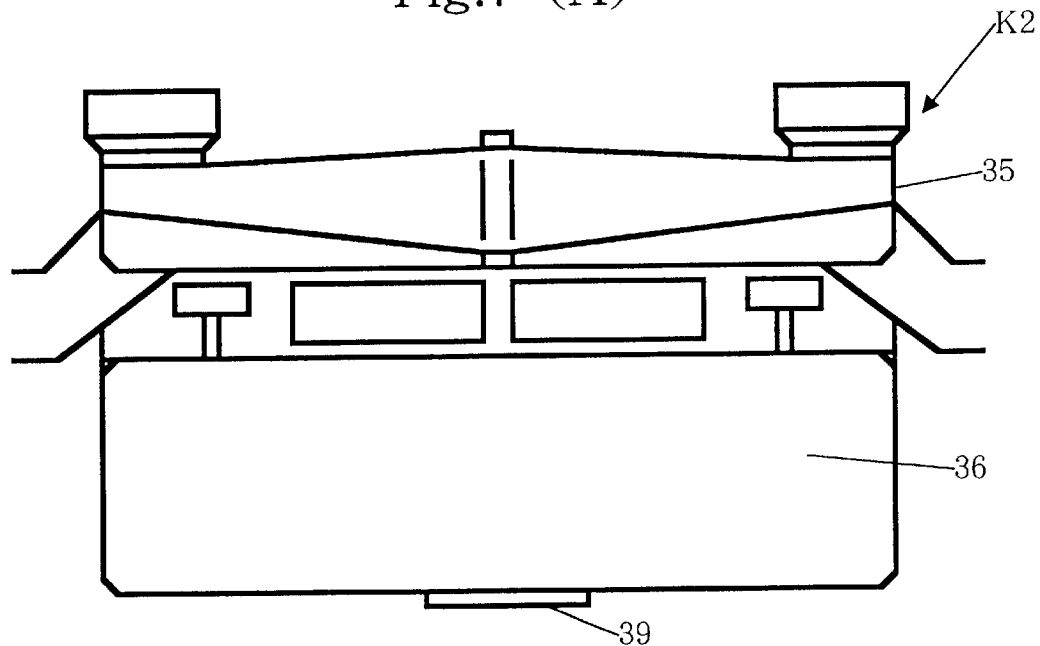
Figure 12:
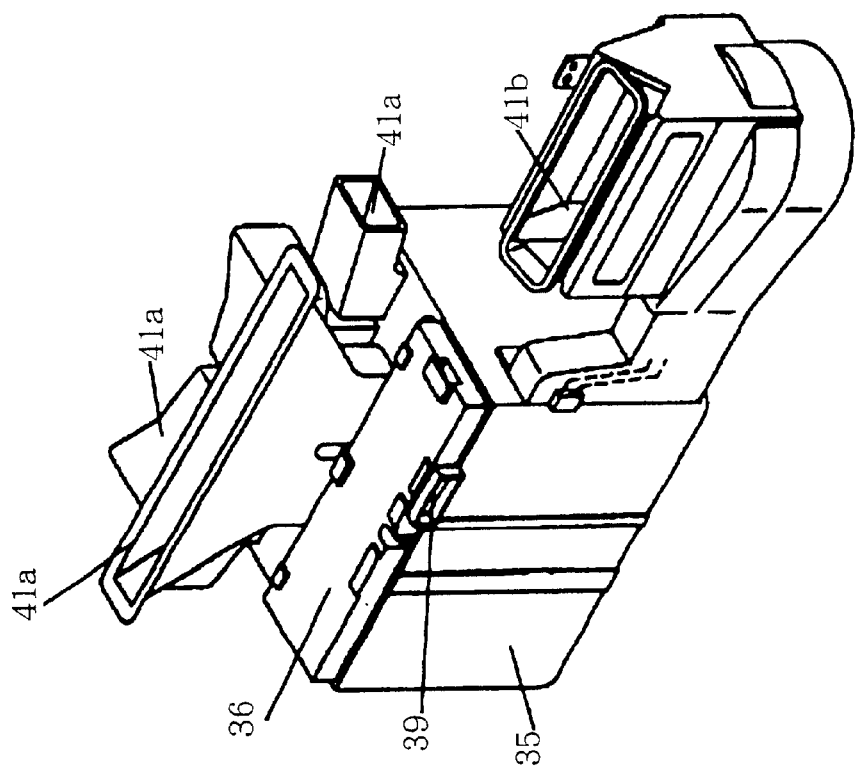
FIG. 12A is a perspective view showing the air-conditioner body and electrical connection box which are separated from each other.
FIG. 12B is a perspective view showing the air-conditioner body on which the electrical connection box has been mounted.
Figure 12:
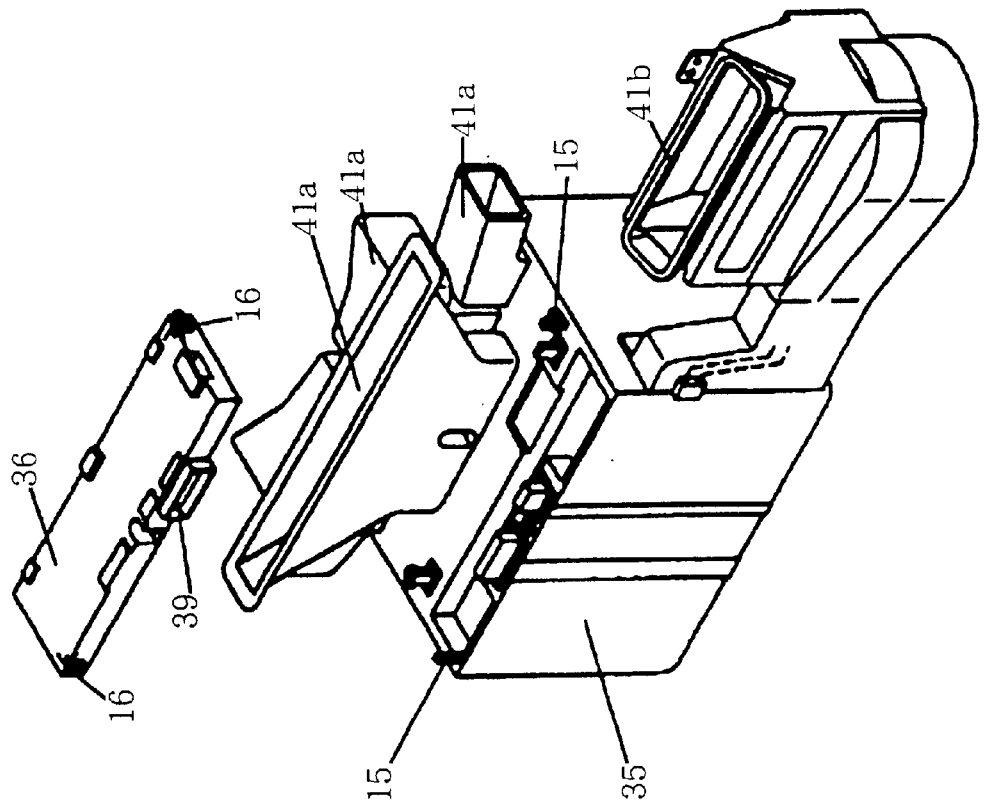
Figure 13:
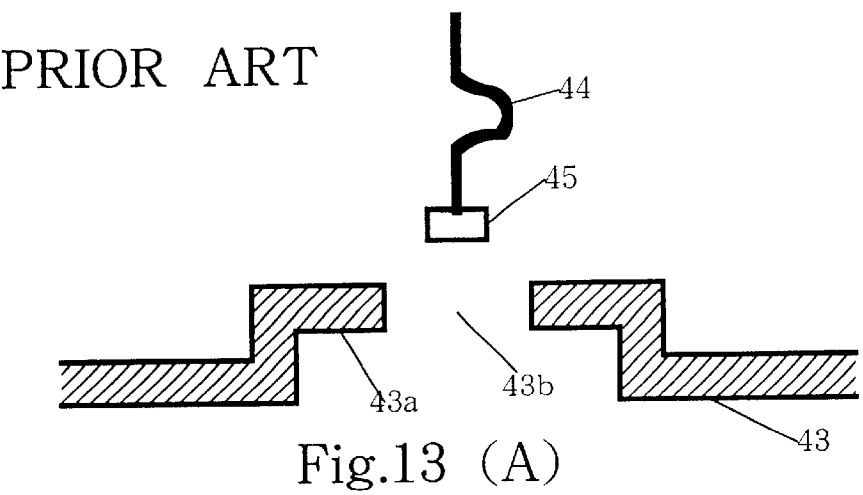
FIGS. 13A–C illustrate a prior art process of mounting an electrical component on the mounting surface of an instrument panel.
Figure 13:
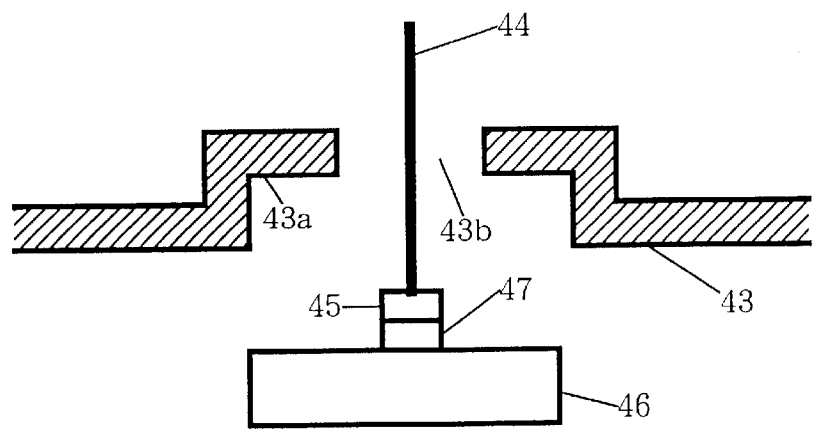
Figure 13:
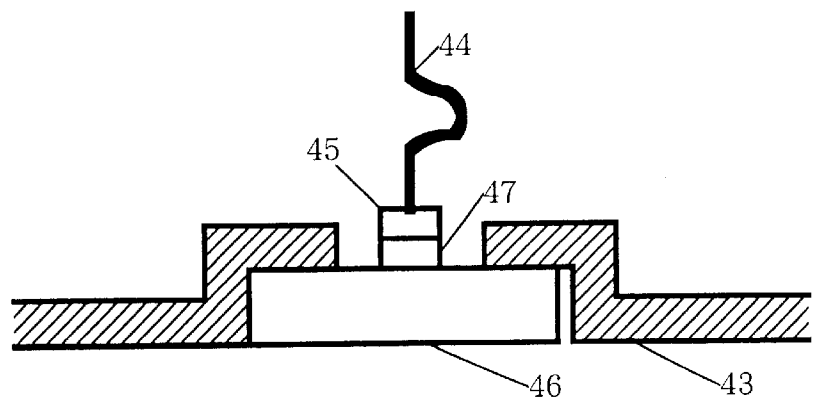
Figure 14:
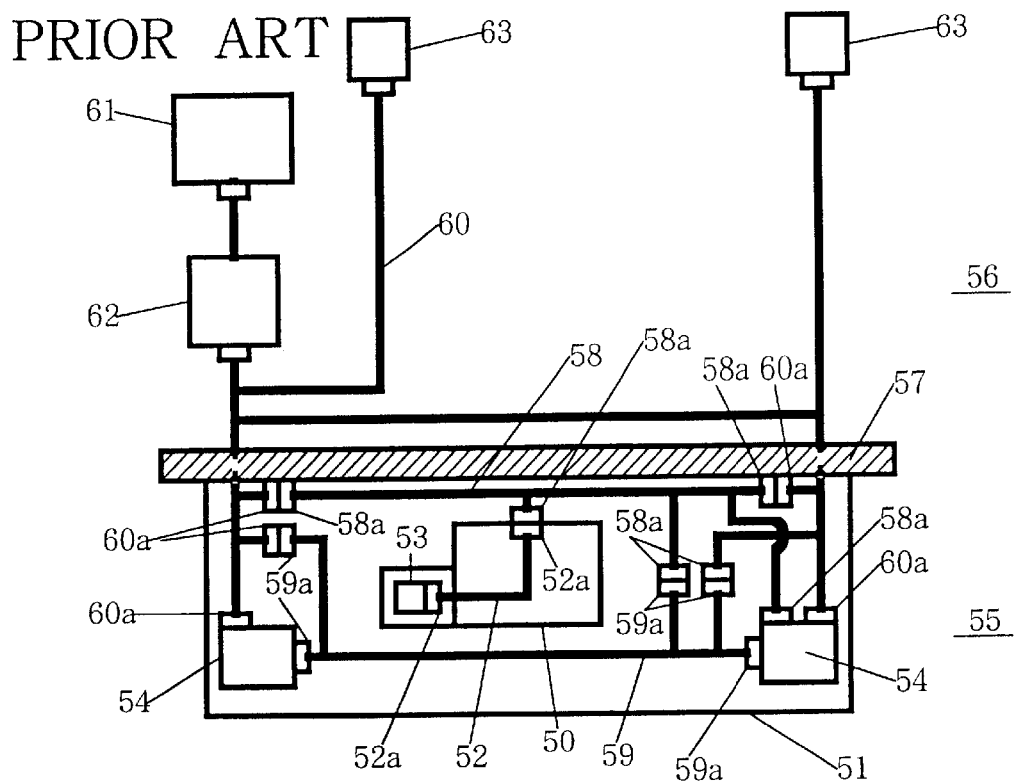
FIGS. 14A and B schematically illustrate the vehicle air-conditioning system and associated parts according to the prior art.
Figure 14:
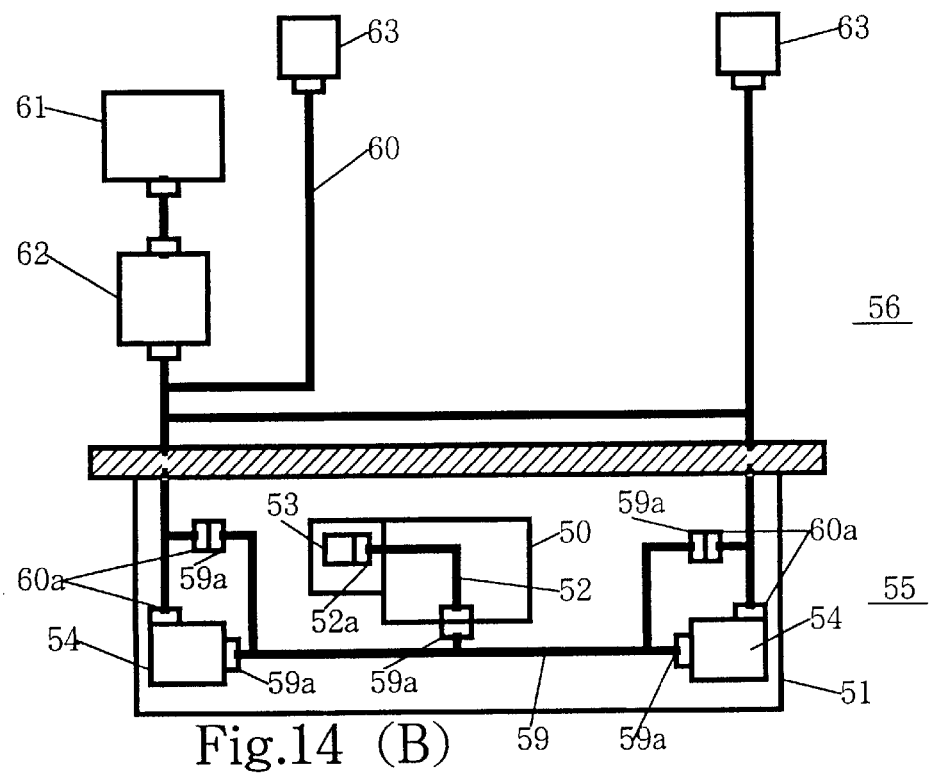
Figure 15:
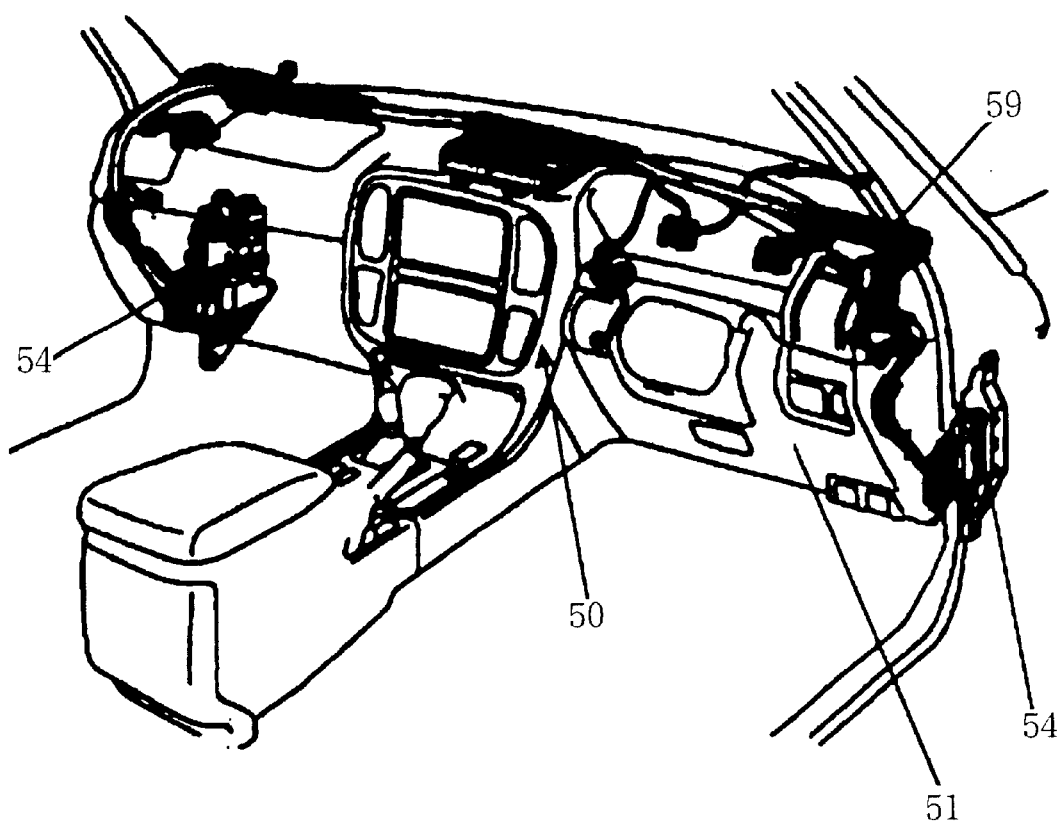
FIG. 15 is a perspective view of a dashboard including a vehicle air-conditioning system and associated parts according to the prior art.

The second embodiment of the present invention will be described below with reference to the drawings. Referring to FIGS. 6, 7 and 12, the second embodiment of the present invention provides a vehicle air-conditioning module K2 which comprises a air-conditioner body 35 substantially centrally located on the inner wall of a dash panel 34 partitioning between a passenger room 32 and an engine room 33, and a electrical connection box 36 mounted on the top of the air-conditioner body 35.

The air-conditioner body 35 is depended from a cross car beam (or auxiliary) bar in an instrument panel 30 or fixedly mounted on the vehicle floor.

The electrical connection box 36 is fixedly mounted on the air-conditioner body 35 through bolting or locking.

Figure 9:
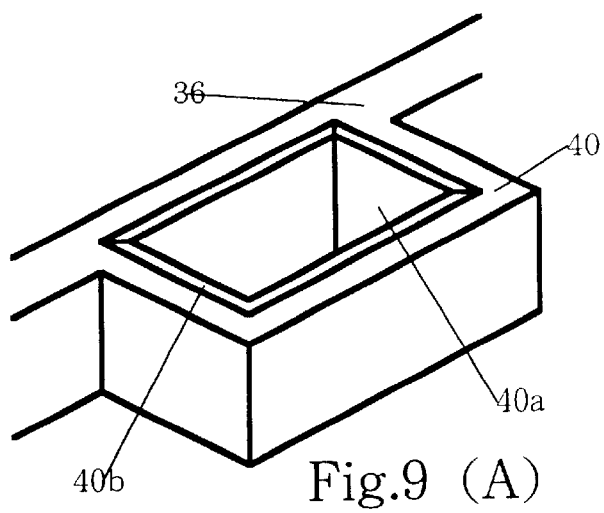
FIG. 9A is a perspective view of a power distribution connector on the side of the electrical connection box.
FIG. 9B is a cross-sectional view showing a state before the power distribution connector on the side of the electrical connection box is fitted into the power supply connector on the side of the air-conditioner body.
FIG. 9C is a cross-sectional view showing another state after the power distribution connector on the side of the electrical connection box has been fitted into the power supply connector on the side of the air-conditioner body.
Figure 9:
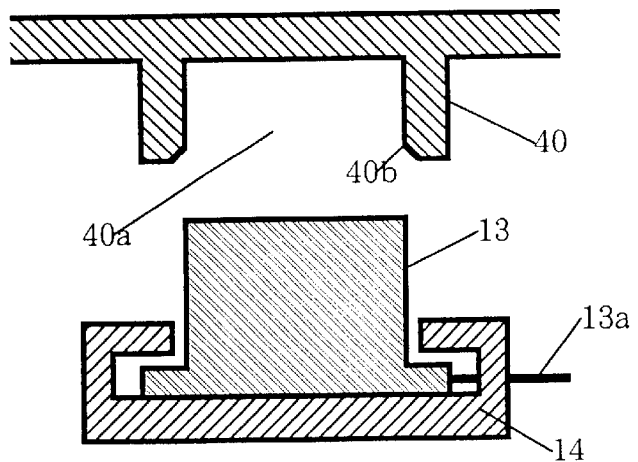
Figure 9:
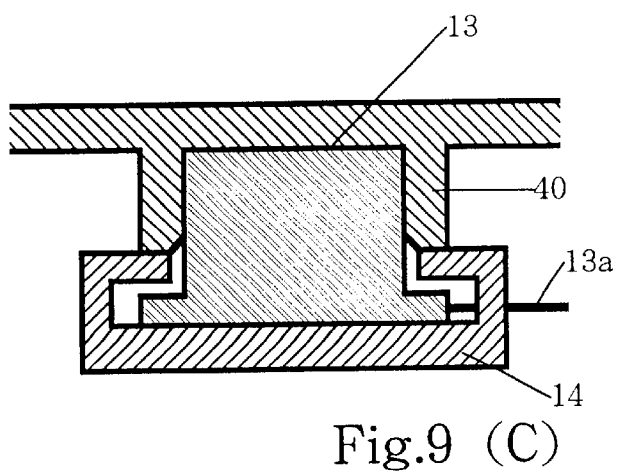

The electrical connection box 36 includes electronic parts 37 such as a circuit protection part 37a, an electrical component control device 37b and so on, wiring materials 38 for electrically connecting the electronic parts such as flat type conductors and wires, an electrical connection box power supply connector 39 (see FIGS. 7 and 12) and electrical connection box power distribution connector 40s (see FIGS. 7 and 9), which connectors 39 and 40 are used to proved an electrical connect between a vehicle power source and external electrical components.

The electrical connection box 36 is of a substantially inverse C-shaped cross-section and has its top and side walls that are formed of any suitable plastic material such as polypropylene (PP), polyethylene (PE) or the like. The electrical connection box 36 further includes electronic parts 37, wiring material 38 and electrical connection box power distribution connectors 40 that are fixedly mounted therein through adhesive or fitting.

Referring to FIG. 9A, each of the electrical connection box power distribution connectors 40 may be formed integrally with the electrical connection box 36. The electrical connection box power distribution connector 40 includes a fitting aperture 40a formed therein, the top and inner edge 4b of which is chamfered.

Referring to FIGS. 7A and 12, the electrical connection box power supply connector 39 is formed on one side of the electrical connection box 36 and has its fitting face faced to the engine room 33 when the electrical connection box 36 is mounted in the vehicle. The electrical connection box power supply connector 39 may be formed integrally with the electrical connection box 36 and take a electromagnetic induction type connector for power supply. The electrical connection box power supply connector 39 may further include a fitting aperture formed therein, the top and inner edge of which is chamfered (not shown).

Referring to FIG. 7A, the bottom of the electrical connection box 36 is partially or wholly opened such that the electronic parts 37 mounted in the electrical connection box 36, including the circuit protection part 37a and the electrical component control device 37b, are externally exposed.

On the other hand, the air-conditioner body 35 includes temperature-regulating air ducts 41a, a blower device 41b and the like, as shown in FIG. 12. The air-conditioner body 35 also includes an air-conditioner sub-wire harness 42a, the connector of which is electrically connected with an electrical component 42b, as shown in FIG. 6.

Cooling parts 12 including a coolant ducting metal pipe 12a, a heat exchanger 12b and so on are located on the top of the plastic housing of the electrical connection box 36 in the air-conditioner body 35, as shown in FIG. A. Moreover, a second opening 35a is formed on the top of the housing of the air-conditioner body by wholly or partially removing the plastic material therefrom. As a result, parts of the coolant ducting metal pipe 12a and heat exchanger 12b are externally exposed. The second opening 35a is properly formed relative to a position where the electronic parts 37 (e.g., heat generating parts such as semiconductor circuit protection parts 37a and the like) are externally exposed through a first opening 36a of the electrical connection box 36 when the electrical connection box 36 is assembled on the air-conditioner body.

The top of the plastic housing on the electrical connection box 36 in the air-conditioner body 35 includes air-conditioner body power supply connectors 13 which are disposed in place so that they fit against the electrical connection box power distribution connectors 40 when the electrical connection box 36 is mounted on the air-conditioner body 35.

Figure 8:
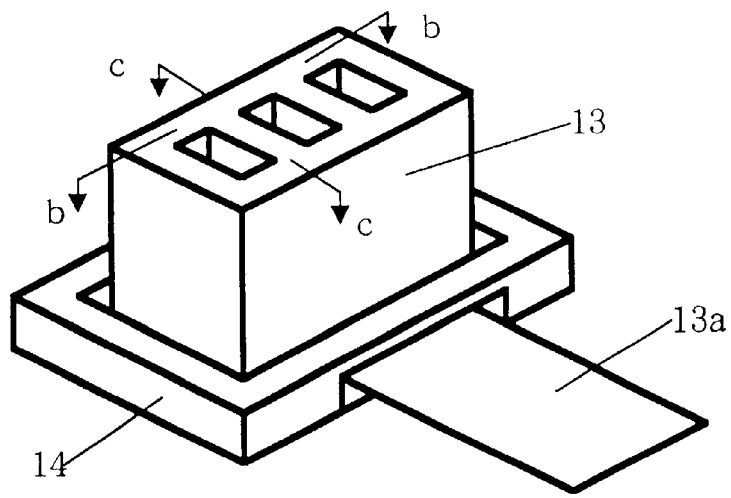
FIG. 8A is a perspective view of a power supply connector on the side of the air-conditioner body.
FIG. 8B is a cross-sectional view of FIG. 8A, taken along a line b—b.
FIG. 8C is a cross-sectional view of FIG. 8A, taken along a line c—c.
Figure 8:
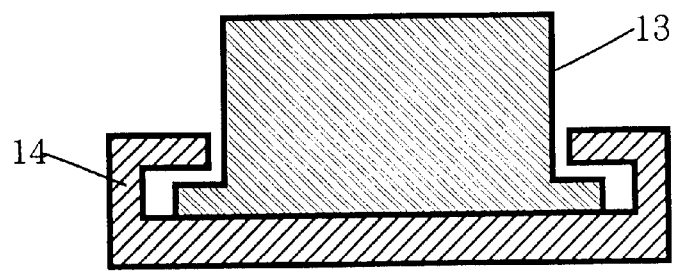
Figure 8:
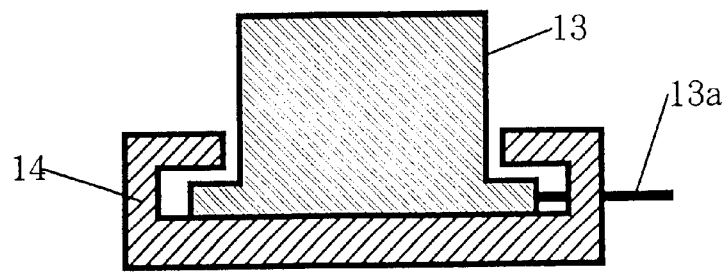

As shown in FIGS. 8A and C, each of the air-conditioner body power supply connectors 13 is electrically connected with any other electrical component in the air-conditioner body 35 through a wiring material 13a which may be of any of various harness forms such as wire harnesses conventionally used in the automobile wires or flat type wire harness. The air-conditioner body power supply connectors 13 are disposed and fixedly mounted on the surface of the air-conditioner body 35 through adhesive, fitting or clipping.

Each of the air-conditioner body power supply connectors 13 is not completely fixed to the air-conditioner body 35, but may be held by a holding member 14 mounted on the air-conditioner body 35 such that it is movable 2–3 mm in the three-dimensional direction relating to a plane perpendicular to the fitting direction, as shown in FIGS. 8B and C. As described, each of the electrical connection box power distribution connectors 40 respectively fitted to the air-conditioner body power supply connectors 13 has the fitting aperture 40a having its chamfered inner edge (see FIGS. 9B and C). Therefore, there will be provided a self-aligning connection between the connectors.

Where the air-conditioner body 35 includes a plurality of electrical components, the air-conditioner body power supply connectors 13 and electrical connection box power distribution connectors 40 may be provided equal in number to that of these components.

As shown in FIG. 12A, at least two positioning ribs 15 are provided on the top of the air-conditioner body 35 at a position wherein the electrical connection box 36 is mounted on the air-conditioner body 35. Thus, the electrical connection box 36 includes two insert apertures 16 formed therein for receiving the respective positioning ribs 15.

Figure 11:
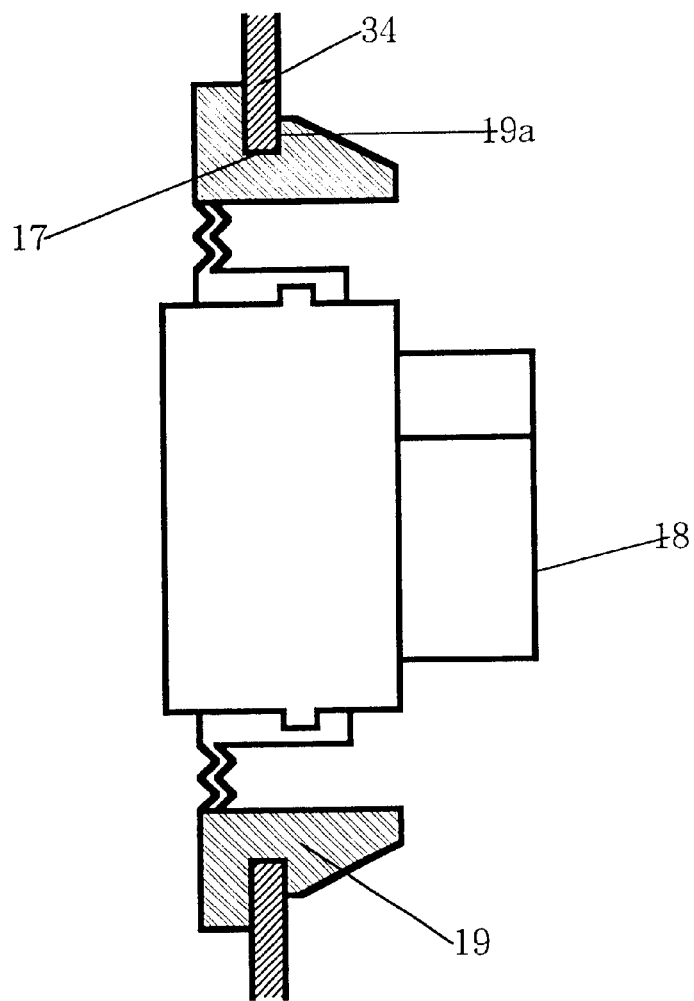
FIG. 11A is a cross-sectional view showing the engine room wire harness connectors and grommet.
FIG. 11B is a side view of a heat conduction plate.
Figure 11:
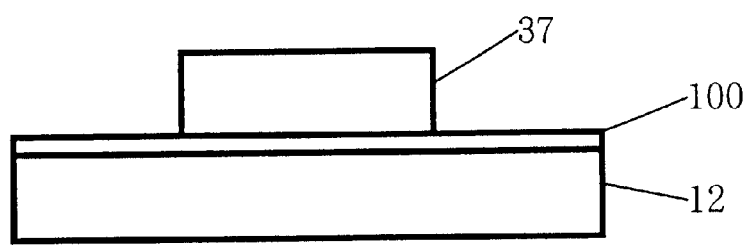

On the other hand, as shown in FIG. 11, a dash panel 34 partitioning between the passenger room 32 and the engine room 33 includes a through-aperture 17 formed therethrough at positions corresponding to the electrical connection box power supply connector 39. The through aperture 17 will fit to the electrical connection box power supply connector 39 when the air-conditioner body 35 is mounted with the electrical connection box 36. An engine room wire harness connector 18 is mounted in the through-aperture 17.

Figure 10:
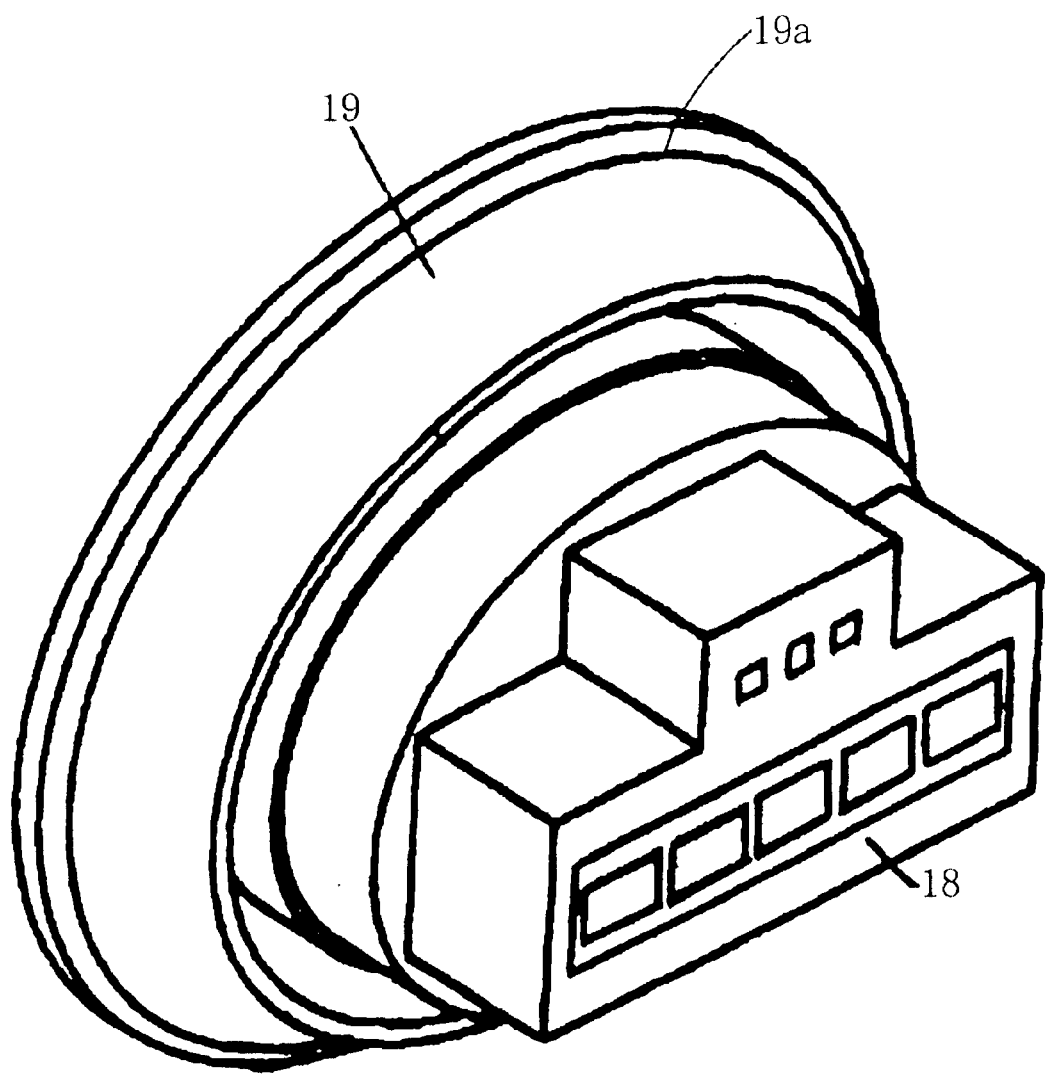
FIG. 10 is a perspective view showing connectors of an engine room wire harness and a grommet.

The engine room wire harness connector 18 is mounted in a rubber grommet 19 as shown in FIGS. 10 and 11A. The outer periphery of the grommet 19 includes a circumferential groove 19a formed therein for receiving the inner edge of the through-aperture 17 in the dash panel 34. When this groove 19a fixedly receives the inner edge of the through-aperture 17 in the dash panel 34, the engine room wire harness connector 18 will be fixedly mounted on the dash panel 34 through the grommet 19.

Since the grommet 19 is of rubber, the engine room wire harness connector 18 is movable 2–3 mm in the three-dimensional direction relating to a plane perpendicular to the fitting direction under the resilience of the rubber. If the electrical connection box power supply connector 39 fitting to the engine room wire harness connector 18 has its chamfered inner edge, the connection between the connectors will have a self-alignment function.

The engine room wire harness connector 18 is electrically connected with an engine room wire harness 19 disposed within the engine room 33 while the engine room wire harness 19 is electrically connected with a electrical connection box 20, electrical components 21, battery 22 and the like all of which are mounted in the engine room 2 (see FIG. 6).

If the electrical connection box power supply connector 39 is in the form of an electromagnetic induction type connector, the engine room wire harness connector 18 may be in the form of an electromagnetic induction type connector.

In FIG. 6, reference numeral 31 denotes an instrument panel wire harness.

The mounting of the electrical connection box 36 on the top of the air-conditioner body 35 will be described.

The exposed side of the electrical connection box 36 is first directed downward (i.e., the state of FIG. 7A being inverted). The positioning ribs 15 in the air-conditioner body 35 are then inserted into the respective insert apertures 16 in the electrical connection box 36 and the electrical connection box 36 will be positioned on the top of the air-conditioner body 35.

The electrical connection box 36 is firmly attached to the top of the air-conditioner body 35 through bolting, locking or any other suitable means.

At this time, the electrical connection box power distribution connectors 40 are fitted to the air-conditioner body power supply connectors 13 so that the electrical connection box 36 will electrically be connected with the electrical components 42b on the air-conditioner body 35.

Any defective connection due to dimensional error, assembling error and the like can be avoided by the self-aligning function in the air-conditioner body power supply connectors 13 and the chamfered edges of the electrical connection box power distribution connectors 40 (see FIGS. 9B and C).

When a position wherein the positioning ribs 15 in the air-conditioner body 35 begin to be inserted into the insert apertures 16 in the electrical connection box 36 is set at a position higher than the fitting faces of the air-conditioner body power supply connectors 13, the positioning ribs 15 are inserted into the insert apertures 16 to position the electrical connection box 36 before the fitting between the connectors is provided. This can prevent any defective fitting between the connectors due to assembling error.

When the electrical connection box 36 is mounted on the air-conditioner body 35, the surfaces of the electrical components 37 exposed through the first opening 36a in the electrical connection box 36 are fixedly brought into contact with the cooling parts 12 including the coolant inducting metal pipe 12a, heat exchanger 12b and the like in the air-conditioner body 35, all of which are exposed through the second opening 35a in the air-conditioner body 35.

In such a manner, heat produced from the electronic parts 37 in the electrical connection box 36 will be conducted into the cooling parts 12 including the coolant conducting metal pipe 12a, heat exchanger 12b and the like. Thus, the electronic parts 37 can be cooled to prevent any malfunction or damage due to heat.

A heat transfer plate 100 (see FIG. 11B) may thermally be connected between each of the cooling parts 12 including the coolant conducting metal pipe 12a, heat exchanger 12b and the like and each of the electronic parts 37. If such a heat transfer plate 100 also has an electrical insulation and waterproof functions, any electrical contact between the cooling parts 12 and the electronic parts 37 can be avoided while at the same time any moisture can be prevented from entering the electrical connection box 36 due to condensation.

Thereafter, the air-conditioner body 35 on which the electrical connection box 36 has been mounted is mounted on the vehicle body while at the same time the electrical connection box power supply connector 39 is connected with the engine room wire harness connector 18. Thus, the electrical connection box 36 and the electrical components 42b of the air-conditioner body 35 are electrically connected with the battery 22 in the engine room 2 to supply them with the electric power.

Any defective connection due to dimensional error, assembling error and the like can be avoided by the self-aligning function provided by the elastic rubber in the grommet 19 mounted on the engine room wire harness connector 18 and the chamfered edge of the electrical connection box power distribution connector 39.

In the above embodiments, the electrical connection box power supply connector 39 is electrically connected with the engine room wire harness connector 18 at the same time when the air-conditioner body 35 is mounted on the vehicle body and after the engine room wire harness connector 18 has been mounted on the dash panel 34. On the contrary, the electrical connection box power supply connector 39 may be mounted on the dash panel 34 at the same time when the air-conditioner body 35 is mounted on the vehicle body, thereafter connecting between the electrical connection box power supply connector 39 and the engine room wire harness connector 18.

The present invention is not limited to the aforementioned embodiment, but may be carried out in any of various other forms without departing from the spirit and scope of the invention as defined in the appending claims.

What is claimed is:

1. A vehicle air-conditioning module having an air-conditioner body located on the inner wall of a dash panel partitioning between a passenger room and an engine room, and an electrical connection box mounted on said air-conditioner body, said module comprising:
    a first connector mounted in a through-aperture formed in said dash panel and electrically connected with an engine room wire harness disposed within said engine room, and
    a second connector mounted on the side of said electrical connection box opposed to said engine room and electrically connected with fan electrical component in said electrical connection box while being fitted to said first connector,
    wherein the surface of said electrical connection box opposed to said air-conditioner body includes a first opening formed therethrough while the surface of said air-conditioner body opposed to said electrical connection box includes a second opening formed therethrough, wherein when said electrical connection box is mounted on said air-conditioner body, an electronic part within said electrical connection box that is externally exposed through said first opening is thermally connected with a cooling part within said air-conditioner body that is externally exposed through said second opening, and
    wherein a heat transfer plate having electrical insulation and water-proof functions is located between said cooling part and said electronic part.

2. The vehicle air-conditioning module according to claim 1 wherein the surface of said air-conditioner body opposed to said electrical connection box includes a third connector mounted thereon for electrically connecting with an electrical components in said air-conditioner body and wherein the surface of said electrical connection box opposed to said air-conditioner body includes a fourth connector for electrically connecting with an electrical component in said electrical connection box while fitting to said third connector.

3. The vehicle air-conditioning module according to claim 1 wherein said first connector is mounted in said through-aperture through a connection formed of a resilient material.

4. The vehicle air-conditioning module according to claim 1 wherein said first and second connectors are electromagnetic induction type connectors.

5. The vehicle air-conditioning module according to claim 2 wherein said third connector is movable at least in a direction perpendicular to the direction in which said third connector is to be connected with said fourth connector.

6. The vehicle air-conditioning module according to claim 2 wherein said fourth connector includes a fitting aperture for fitting to said third connector, the top and inner edge of which is chamfered.

7. A vehicle air-conditioning module having an air-conditioner body located on the inner wall of a dash panel partitioning between a passenger room and an engine room, and an electrical connection box mounted on said air-conditioner body, said module comprising:
    a first connector electrically connected with an engine room wire harness disposed in said engine room, and
    a second connector mounted in a through-aperture formed in said dash panel for electrically connecting with an electronic parts in said electrical connection box while fitting to said first connector,
    wherein the surface of said electrical connection box opposed to said air-conditioner body includes a first opening formed therethrough while the surface of said air-conditioner body opposed to said electrical connection box includes a second opening formed therethrough, wherein when said electrical connection box is mounted on said air-conditioner body, an electronic part within said electrical connection box that is externally exposed through said first opening is thermally connected with a cooling part within said air-conditioner body that is externally exposed through said second opening, and
    wherein a heat transfer plate having electrical insulation and water-proof functions is located between said cooling part and said electronic part.

8. The vehicle air-conditioning module according to claim 7 wherein the surface of said air-conditioner body opposed to said electrical connection box includes a third connector mounted thereof for electrically connecting with an electrical component in said air-conditioner body and wherein the surface of said electrical connection box opposed to said air-conditioner body includes a fourth connector for electrically connecting with an electrical components in said electrical connection box while fitting to said third connector.

9. The vehicle air-conditioning module according to claim 8 wherein said third connector is movable at least in a direction perpendicular to the direction in which said third connector is to be connected with said fourth connector.

10. The vehicle air-conditioning module according to claim 8 wherein said fourth connector includes a fitting aperture for fitting to said third connector, the top and inner edge of which is chamfered.

* * * * *

UNITED STATES PATENT AND TRADEMARK OFFICE
CERTIFICATE OF CORRECTION

PATENT NO. : 6,692,261 B2
DATED : February 17, 2004
INVENTOR(S) : Matsuda et al.

It is certified that error appears in the above-identified patent and that said Letters Patent is hereby corrected as shown below:

Column 11,
Line 38, which reads "fan", should read -- an --.
Line 60, which reads "components", should read -- component --.

Signed and Sealed this

Fourteenth Day of December, 2004

JON W. DUDAS
*Director of the United States Patent and Trademark Office*